July 23, 1963  D. K. WILSON ETAL  3,098,934
SUN TRACKER
Filed Feb. 4, 1960  5 Sheets-Sheet 1
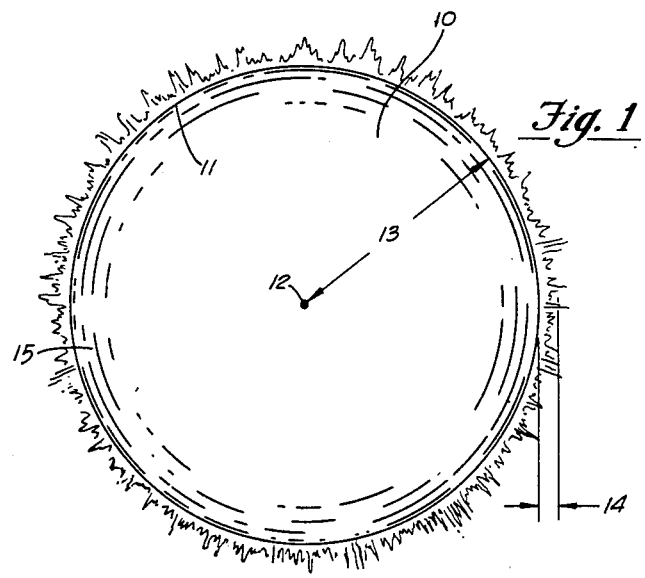
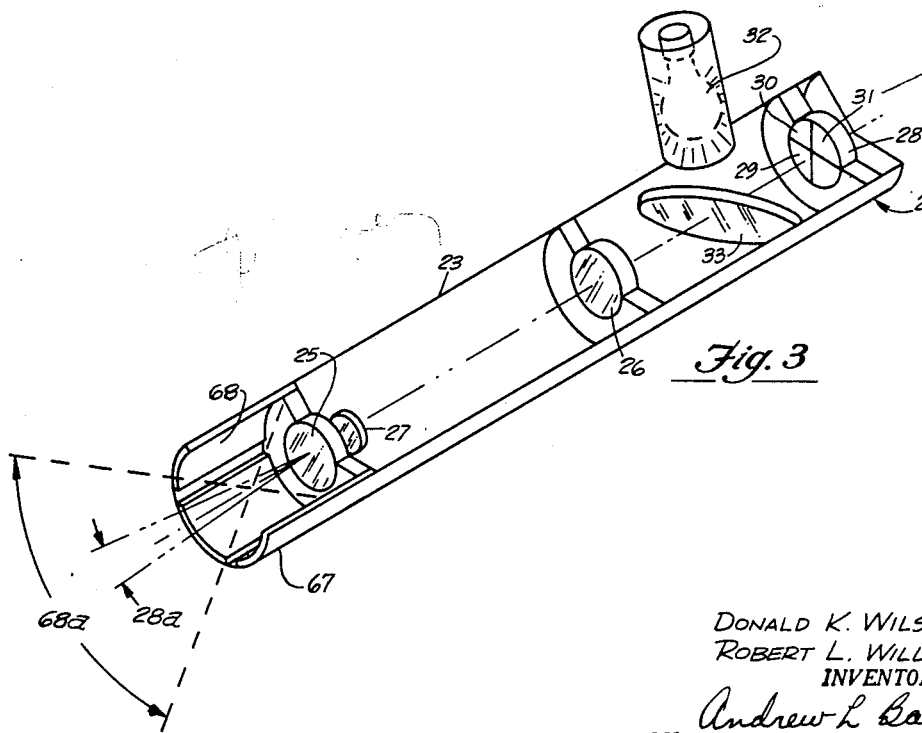
DONALD K. WILSON
ROBERT L. WILLES
INVENTORS
BY Andrew L. Bain
George B. Oujevolk
ATTORNEYS Donald K. Wilson
Robert L. Willes
INVENTORS BY Andrew L. Bain
George B. Oujevolk

ATTORNEYS

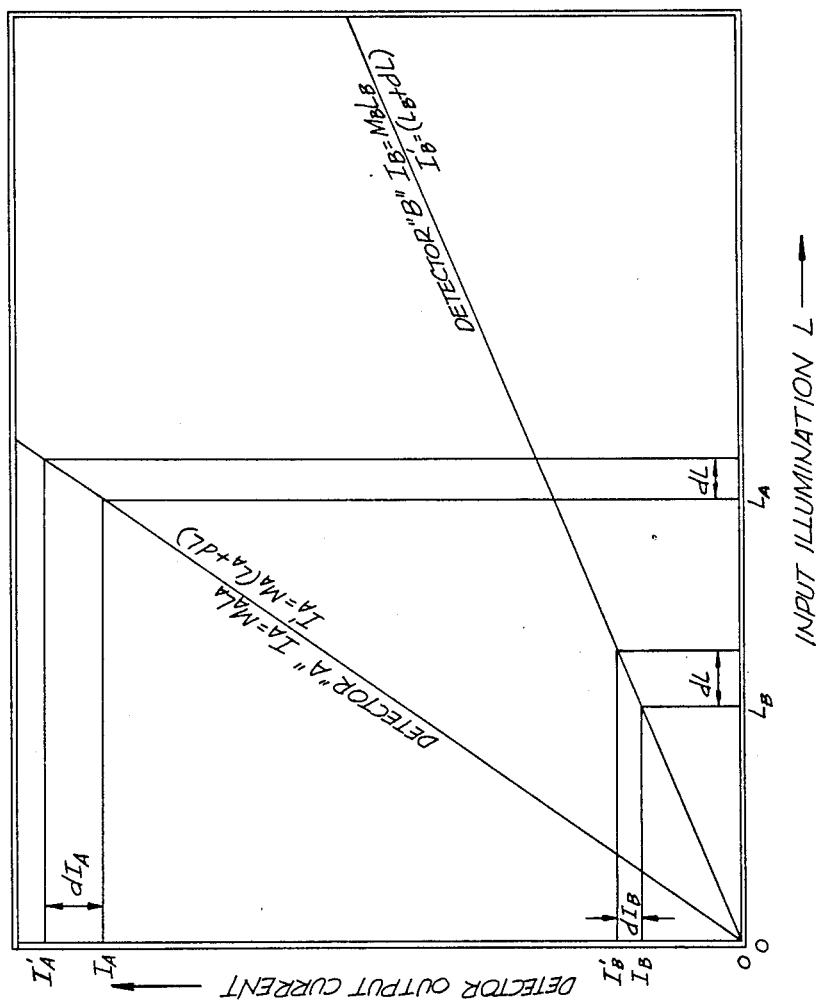

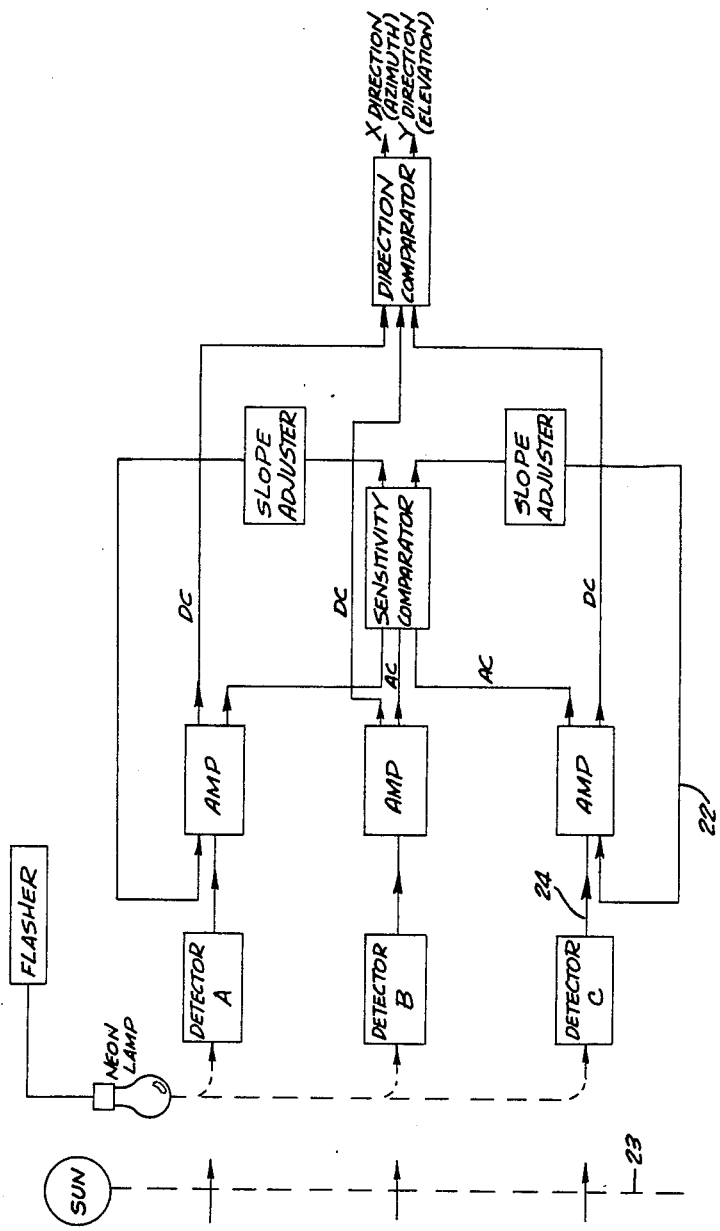

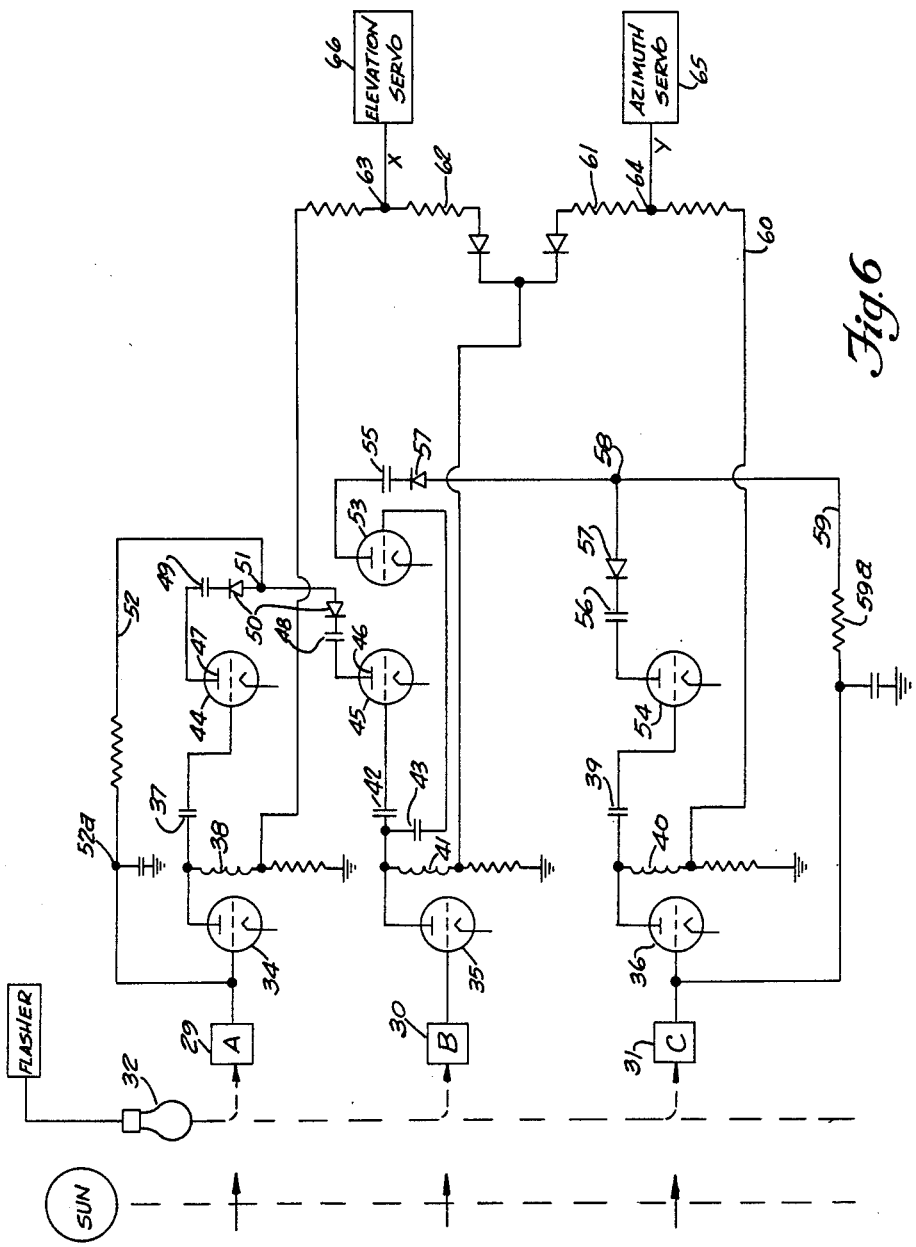

United States Patent Office 3,098,934
Patented July 23, 1963

3,098,934
SUN TRACKER
Donald K. Wilson, North Caldwell, and Robert L. Willes, Glen Rock, N.J., assignors to General Precision, Inc., Little Falls, N.J., a corporation of Delaware
Filed Feb. 4, 1960, Ser. No. 6,785
7 Claims. (Cl. 250—203)

The present invention relates to the guidance of a manned or unmanned vehicle by tracking the sun.

The principal purpose of a sun tracker is to provide vehicle-sun angular directional information in azimuth and elevation, the sun bearing being obtained by reading the angle of the sun tracker with respect to the vehicle. In space navigation, or in the navigation of unmanned vehicles, it may be either essential or advantageous to have a tracking device to locate the sun and to provide the desired vehicle-sun angular directional information. Although some attempts may have been made to provide a small, compact system or device of high accuracy, none, as far as we are aware, were successful when carried out into actual practice.

It has now been discovered that means can be provided for automatically tracking the sun from a vehicle.

It is an object of the present invention to provide a device for tracking the sun which is small, compact, accurate, efficient, of simple design and which can be used not only in atmosphere, but in manned and unmanned space vehicles.

Another object of the present invention is to provide a manner of tracking the sun from a vehicle.

The invention in its broader aspects contemplates a telescopic system which will sight the sun and project its image onto a plurality of detectors disposed in such a manner that when the telescopic portion of the system is aimed at the sun center, each detector will see equal sun sectors. When the image areas or intensities on the detectors are equal, a null condition exists and the telescope is pointed directly at the center of the sun. If the image is off-center, one of the image sectors on a detector is smaller than the others. By measuring and comparing the detector output signals, an off-center correction is generated to move the telescope until the image areas or intensities on the detectors are all again equal.

The invention as well as its many objects and advantages will become more apparent from the following description taken in conjunction with the accompanying drawing in which:

FIG. 1 shows the sun which will be seen by the device herein contemplated;

FIG. 3 is a longitudinal view of one embodiment of the invention contemplated herein partially cut open to show details of construction;

FIG. 4 is a graphic analysis of detector equalization;

FIG. 5 illustrates in block diagram the equalization of the detectors for the device contemplated in FIG. 3, and means for centering the apparatus;

FIG. 6 is a schematic diagram illustrating details for equalization and centering of the detectors shown in the block diagram of FIG. 5;

Figure 7B:
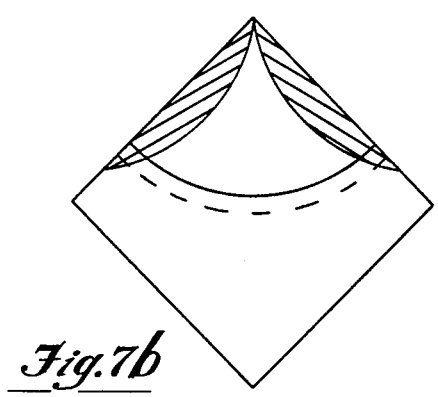
FIG. 7B illustrates the effect of masking the image shown in FIG. 7A.

Before describing the invention, it is first necessary to describe the sun which the device contemplated herein must track. The sun as seen from mean earth-distance subtends an angle of roughly ½°. Thus, to sight the disk with higher angular accuracy, it is necessary to define a point on the disk. The most easily determined geometric point is the center. One way of determining the center is by splitting the disk into four 90° sectors or quadrants. When the four areas are equal, the center is determined. In fact, when three of these areas are equal, the fourth must also be equal.

The sun 10 includes a disk 11 having a center 12, and which is circular within 1/100 second of arc, i.e., the radius 13 will be plus or minus 0.01 second of arc. On the outer rim of the disk is the coronal limb 14 which is 0.2% of the actual diameter. However, in discussing the diameter, the limb may be considered to average out to uniformity. For the purpose of the present invention, the disk is assumed as uniform and geometrically perfect. With regard to brightness, the center of the disk 12 is much brighter than the portion towards the rim 15. But, the non-uniformity in brightness is a function of the radius. Thus, the system herein contemplated utilizes an area determined by the radial distance.

Figure 2:
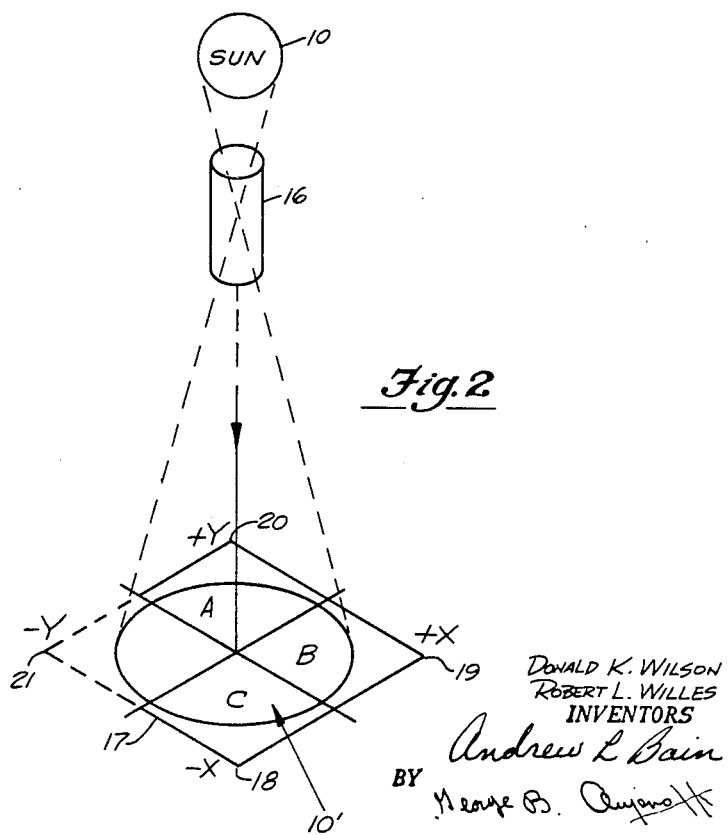
FIG. 2 illustrates in perspective some of the scientific principles involved in connection with the present invention.

The general principles of the system are best explained with reference to FIG. 2. The telescopic system 16 sights the sun 10 and projects its image 10' on an array of four equal squares 18, 19, 20, and 21, arranged as quadrants plus-X; minus-X; plus-Y; minus-Y, i.e., the four squares are so arranged as to form one large square 17. Associated with three of these squares, 18, 19, and 20, are detectors A, B, and C. In this manner, each detector A, B, and C, senses a 90° sector of the on-center sun disk image 10' projected by telescope 16. If the image is off-center, one of the image sectors on a detector is smaller than the others. By mounting the squares in the telescope and moving the telescope about, a position will be found where the image sector on all three detectors is equal so that the angular directional information in azimuth and elevation between the telescope and the vehicle can be obtained.

To embody the principles illustrated in connection with FIG. 2 in a practical device, it is necessary to provide the combination of a coarse view finder having a wide field of view; a viewing section capable of viewing the sun and projecting its image; a detection section adapted to have areas of the sun projected by the viewing means sensed by at least three detector means; equalization means to equalize the output of the detector means when each of said detectors senses an equal area of the sun; and, a servo section responsive to both the coarse view finder and the detection section to track the sun in response to the output of said sections. In describing the foregoing apparatus, reference will be made first to the viewing and detection sections which are the heart of the apparatus, in connection with which an explanation will be given of the equalization means. The operation of the coarse view finder and the servo system will then be better understood.

The viewing and detection sections are embodied in a housing 22 having a telescopic section 23 and an electronic section 24. The telescopic section includes a glass mounting dish 25, a primary mirror 26, and a secondary mirror 27. Light passing through dish 25 and reflected by mirror 26 is then beamed by mirror 27 towards a detector array 28 arranged as a disk at right angles to the longitudinal axis of the telescopic section 23. The detector array 28 has three detectors 29, 30, and 31, corresponding to detectors A, B, and C, hereinbefore described. Each detector being associated with a quadrant or a 90° circular section of array 28.

The telescopic section 23 just described is a Cassegrainian system and can be short in length, e.g., about two inches long in which case the image may be out of focus. Being out of focus, however, does not affect the inherent accuracy of the system. The only function of the telescopic section 23 is to project a small solar image, some-what of the order of one-tenth inch diameter onto detectors 29, 30, and 31, which lie behind the primary mirror so that information from these detectors can be supplied to the servo system.

Detectors 29, 30, and 31 are preferably silicon photovoltaic cells. In this type of cell, the output current is directly proportional to the input illumination, and, for the purpose of the present invention, it is essential that a linear equation describes the cell output, and, that at zero illumination, there should be zero output. In other words, the responses of all cells in respect to light are straight lines, intersecting at the origin, or zero when there is no light, but of different slopes. Since two photodetectors may not have identical characteristics and, furthermore, an individual detector's characteristics may drift with time and temperature, it is necessary to calibrate continuously the detectors with respect to each other. The explanation of the calibration will best be understood by reference to FIG. 4. Here, we consider two of the detectors, A and B, to determine what signifies that the solar illumination on each cell is equal.

When the sun's disk image illuminates A and B, the amount of light on each is $L_A$ and $L_B$ respectively. As already stated, the detectors must be such that at zero illumination, there is zero output. Thus, for the amount of illumination $L_A$ there is $I_A$ output current and for the illumination $L_B$ there is $I_B$ output current, and the output current $I_A$ need not be equal to $I_B$ even though both $L_A$ and $L_B$ are equal. A graph of the output of both detector A and B can be made where detector A has an output slope of $M_A$ and detector B has an output slope of $M_B$. Thus, $I_A = M_A \times L_A$ and $I_B = M_B \times L_B$. If a lamp is so disposed in relation to detectors A and B that it will illuminate A and B equally, when this lamp is flashed on, it will increase the input light on each cell by an amount $dL$ so that under the ideal conditions described $I_A' = M_A(L_A + dL)$ and $I_B' = M_A(L_B + dL)$. Since under the conditions given $L_A = L_B$, then, by equating, $I_A/I_A' = I_B/I_B'$ (or by the same reasoning $I_A/I_A' = I_C/I_C'$). When such condition exists as to the three quadrants or detectors, on-center is known.

To calibrate the detectors, there is provided therefore a neon calibration bulb 32 in the vicinity of the detector cells. Light from this bulb 32 is then played upon cells 29, 30 and 31, advantageously by a half-reflecting mirror 33 placed before the cells at a 45° angle. Thus, the sun illumination penetrates through the half-reflecting mirror and the light from the calibration lamp is reflected from the mirror onto the detector cells. In this way, there is achieved the condition $L_A + dL$; $L_B + dL$; and $L_C + dL$ on detectors 29, 30 and 31. Since light from the sun $L_A$, $L_B$, and $L_C$ is continuous this gives rise to a D.C. detector output. And, since light from a neon bulb is flashing on and off, the light from the bulb $dL$ gives rise to a pulsating square wave, which for the purpose of the present invention can be called A.C.

As depicted in the block diagram, and the schematic illustration, the output on the detectors, 29, 30 and 31 is first amplified in an amplification stage. This may consist of a simple triode tube. One of the detectors, 30, is the midpoint of the system and is the reference point for adjusting or equalizing the other two detectors 29 and 31. Past the amplification stages 34, 35, and 36 of each detector, the D.C. is removed by a branch circuit with condensers 37, 39, and 42—43, in one branch and an inductance coil 38, 40, and 41 in the other. The D.C. not being able to jump across the condenser goes along the path of the coil, which acts as a choke to block off the A.C., forcing the A.C. across the path of least impedance, i.e., across the condenser. We will first follow the A.C. path and then the D.C. path. Looking at the circuit of detector B, the A.C. output from the amplification stage is fed across condenser 42 to the grid of a triode tube 45, the plate of this tube 46 is coupled to the plate 47 of the corresponding triode tube 44 of detector A, in a back-to-back coupling across condensers 48 and 49, and unidirectional crystals or diodes 50. Midway 51 between the unidirectional means, e.g., crystals or diodes 50, is a feedback line 52 going to the input of the amplification stage 34 of detector A. Along feedback line 52 is an integrator stage 52a to transform the pulsating current along line 52 to D.C. If the output from plates 47 and 46 are equal, the current at the junction through unidirectional means 50 and 51 will balance out, and there will be no feedback input at amplifier 34. If the current at the junction point does not balance, there will be a feedback along feedback line 52 to the grid of tube 34 thereby adjusting the amplification of tube 34 so that the current at the junction is equalized. Thus, the outputs of detector A and B are equalized. In the same way, the output of the amplification stage 35 of detector B is fed across condenser 43 to the grid of another triode tube 53 which in turn is in back to back relationship with the corresponding tube 54 of detector C across condensers 55 and 56 and unidirectional means 57. At the junction 58 of unidirectional means 57 is feedback line 59 to the grid of tube 36 of detector C across integrator stage 59a. If the current at the junction point is not balanced, i.e., if the outputs of tubes 53 and 54 are unequal, there will be feedback current through 59 until the outputs of these tubes are equal. Thus, the detectors are equalized.

The detectors being now equalized, the D.C. levels can now be compared. If B is the center of the system, then $B_{DC} - A_{DC}$ and $B_{DC} - C_{CD}$ represent the X and Y error in aiming. The D.C. output of detector B serves as the midpoint, the outputs of detectors A, B, and C, across choke coils 38, 40, and 41 being fed to a comparator circuit 60, the output of detector B being fed to a point between two equal resistor bridges 61 and 62, the output of detector A being fed to resistor 62, and C, to 61. The difference between D.C. outputs B and A 63, and D.C. outputs B and C 64 across resistor bridge 61 and 62 represent the X and Y error in aiming. These two error signals are amplifier to serve the sun tracker head aiming mechanism to aim at the sun center. On dead-center aim, $B_{DC} - A_{DC}$ and $B_{DC} - C_{DC}$ will equal zero and the null condition exists.

Inasmuch as telescope 23 has a 1° field of view 28a, it is necessary to provide a wide field of view 68a for coarse finding. Mounted on the front end of telescope 23 is a sunshade in the form of a truncated cone 67 of ¼ degree sloping sides much like a camera sunshade. Fixed to the inside of this sunshade are a plurality of solar cells 68, preferably four. The purpose of the sunshade 67 is to provide a directional shadow-effect upon solar cells 68. If the telescope is not aimed at the sun, neither the coarse solar cells 68 nor the detector cells 29, 30, and 31 are illuminated. The servo system is unstable in this condition and this instability causes a simple search program to be performed. The telescope is moved in azimuth and elevation. Regardless of the telescope's elevation, there is one azimuth position where at least one of the coarse or solar cells 68 is in sunlight. At this position, azimuth movement stops, but elevation motion continues until the telescope is aimed toward the sun; then, the sun is within the telescope's one degree field of view and the detector cells are illuminated. The relationship of the coarse solar cells to the apparatus will best be understood with reference to FIG. 3. The detector cells 28 have a field of view 28a which is only about one degree of arc. Solar cells 68 have a much wider view 68a.

Figure 7A:
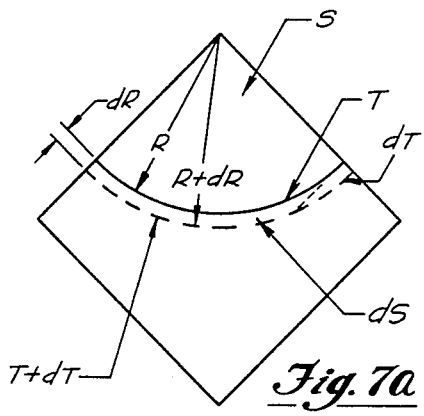
FIG. 7A depicts an unmasked image of the sun viewed by the device of FIG. 3.

To increase the accuracy of the detectors, it is advantageous to mask the sun image, as shown in FIGS. 7A and 7B. If we consider sector S, one of the sectors as it appears when the telescope 23 is on-center, then, as the telescope moves slightly off-center, the area of sector S increases by an amount $dS$. For an off-center angle of, say one second of arc, it is a good approximation to say that the radius R of the sector has increased by $dR$. If the circumference of sector S was T, the circumference has increased by an amount $dT$. Then, $dS=(T+dT)dR$; however, if $dR$ is much smaller than R then $dS$ is much smaller than S and $S+dS$ is difficult to measure in comparison to S. Suppose then that the sector is masked with an opaque pattern bordered by convexly curved sides. Now, $dT$ increases at a higher rate with a linear increase in $dR$. Thus, a small increase in radius is interpreted as a large comparative increase in area. The three quadrants of the detector array can thus be masked with this pattern so that a small angular displacement of the telescope produces a large relative change as measured by the detectors. In the mask depicted in the drawing, an off-center motion of the image of three seconds are arc results in a five percent change in detector area exposed.

The telescope of the apparatus herein described is mounted on an elevation disk which is mounted to an azimuth platform. There are provided separate azimuth and elevation drive servos 65 and 66 which are responsive to the output of the coarse solar cells and the detector cells. Such a servo system is known as a positional servomechanism and has been described by Brown and Campbell in "Principles of Servomechanisms," John Wiley & Sons, New York, 1948, pages 42 to 48. In order to prevent the telescope overshooting the sun, a rate feedback technique is employed in the servo system.

The azimuth and elevation information may be converted to digital form for telemetering to an observer, recorded for future reference, or used to control the orientation of the vehicle, etc.

It is to be observed therefore, that the present invention provides for an improvement in a sun track which comprises in combination a housing 22; a telescope 23 in said housing, adapted when aimed at the sun to project its image; three detectors 29, 30, and 31, arranged in said housing 22, at right angles to the longitudinal axis of the telescope and at a point where said sun image can be projected thereon, each detector being of a size and so disposed that there will be projected on each, a quadrant of the sun image, each detector being capable of causing a D.C. electric current to flow in response to the action of light thereon in linear proportion to the amount of said light; a flashing light source 32 so disposed as to illuminate said detectors equally, said flashing giving rise to an A.C. current; condenser means 37, 39, 42 and 43 associated with each of said detector outputs to separate into separate circuits, said A.C. current caused by said flashing light source 32 and the linear D.C. current caused by said sun image; separate A.C. bridge means between one of said detector A.C. circuits, e.g., amplifier 45 as center and each of the other two detector A.C. circuits, e.g., amplifiers 44 and 54, each of said bridge means including a midpoint 51 and 58 which is at null when the current on both sides of said bridge, e.g., from amplifiers 44, 45 and 54, is equal; feedback means 52 and 59 from said midpoints 51 and 58 to the input of each of said other two detector circuits A and C adapted to have any current flow value in said bridges fed back to said input so as to obtain a null value in said bridges; separate D.C. bridge means 61 and 62 between one of said detector D.C. circuits B as the center and each of said other two D.C. detector circuits B and C, said bridges 61 and 67 likewise including a midpoint which is at null when current on both sides of said bridges 61 and 62 are equal, one of the bridges between said center detector circuit and one of said side detector circuits acting as the elevation circuit, e.g., X axis, and, the other bridge between said center detector and said other side detector circuit acting as the azimuth circuit or Y axis; and servo means 65 and 66 responsive to each of said elevation and azimuth circuits to move said housing in azimuth and elevation until the midpoints of said elevation and azimuth circuits are at null. There is also provided a truncated cone-shaped coarse finding means 67 mounted on the front of said telescope to increase the field of view of the telescope. To increase the sensitivity of the detectors it may be advantageous to provide a convex mask bordering each detector.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a sun tracker, in combination, a telescope adapted to sight the sun and project its image; at least three detectors so disposed in side by side relationship that when said telescope is aimed at the sun center, each detector will sense equal sun sectors, and if said telescope is off-center, the image sensed by at least one detector will be smaller than the others; electrical output giving means associated with each detector adapted to have a linear output current flow responsive to the sun intensity on said each detector; bridge means between said outputs so disposed that when the outputs across said bridge means are equal, no current flows across the bridge; servo means responsive to the current flow in said bridge to move said telescope until said outputs across said bridges are null; flashing means adapted to illuminate said detectors equally, thereby causing said detectors to have an output from said sun and alternating output from said flashing means; output separating means to separate said alternating output from said linear output; A.C. bridge means between said alternating outputs; and feedback means from said A.C. bridge means to said detector output to bring the alternating outputs across said bridges to a null.

2. In a sun tracker, in combination, a housing; a telescope in said housing, adapted when aimed at the sun to project its image; three detectors arranged in said housing at right angles to the longitudinal axis of the telescope and at a point where said sun image can be projected thereon, each detector being of a size and so disposed next to another detector that there will be projected on each, a quadrant of the sun image, each detector including a circuit capable of causing a D.C. electric current to flow in response to the action of light thereon in linear proportion to the amount of said light; a flashing light source, so disposed as to illuminate said detectors equally, said flashing giving rise to an A.C. detector output current; condenser means associated with each of said detector outputs to separate into separate circuits said A.C. current caused by said flashing light source and the linear D.C. current caused by said sun image; separate A.C. bridge means between one of said detector A.C. circuits as center and each of the other two detector A.C. circuits, each of said bridge means including a midpoint which is at null when the A.C. current on both sides of said bridge is equal; feedback means from said midpoints to the input of each of said other two detector circuits adapted to have any current flow value in said bridge fed back to said input so as to obtain a null value in said bridge; separate D.C. bridge means between one of said detector D.C. circuits as the center and each of said other two D.C. detector circuits, said bridges likewise including a midpoint which is at null when D.C. current on both sides of said bridges are equal, one of the bridges between said center detector circuit and one of said side detector circuits acting as the elevation circuit, and, the other bridge between said center detector and said other side detector circuit acting as the azimuth circuit; and, servo means responsive to each of said elevation and azimuth circuits to move said housing in azimuth and elevation until the midpoints of said elevation circuit and said azimuth circuits are at null.

3. In a sun tracker, in combination; a housing; a telescope in said housing, adapted when aimed at the sun to project its image; three detectors arranged in said housing, at right angles to the longitudinal axis of the telescope and at a point where said sun image can be projected thereon, each detector being of a size and so disposed next to another detector that there will be projected on each, a quadrant of the sun image, each detector including a circuit capable of causing a D.C. electric current to flow in response to the action of light thereon in linear proportion to the intensity of said light; a flashing light source so disposed as to illuminate said detectors equally, said flashing giving rise to an A.C. detector output current; an output amplifier stage to amplify said output; condenser means associated with each of said amplified detector outputs to separate into separate circuits, said A.C. current caused by said flashing light source and the linear D.C. current caused by said sun image; separate A.C. bridge means between one of said detector A.C. circuits as center and each of the other two detector A.C. circuits, each of said bridge means including a midpoint which is at null when the A.C. current on both sides of said bridge is equal; feedback means from said midpoints to the input of each of said other two detectors adapted to have any current flow value in said bridge fed back to said input so as to obtain a null value in said bridge; separate D.C. bridge means between one of said detector D.C. circuits as the center and each of said other two D.C. detector circuits, said bridges likewise including a midpoint which is at null when D.C. current on both sides of said bridges are equal, one of the bridges between said center detector circuit and one of said side detector circuits acting as the elevation circuit, and, the other bridge between said center detector and said other side detector circuit acting as the azimuth circuit; and servo means responsive to each of said elevation and azimuth circuits to move said housing in azimuth and elevation until the midpoints of said elevation and azimuth circuits are at null.

4. In a sun tracker, in combination; a housing; a telescope in said housing, adapted when aimed at the sun to project its image; three detectors arranged in said housing, at right angles to the longitudinal axis of the telescope and at a point where said sun image can be projected thereon, each detector being of a size and so disposed next to another detector that there will be projected on each, a quadrant of the sun image, each detector including a circuit capable of causing a D.C. electric current to flow in response to the action of light thereon in linear proportion to the intensity of said light; a flashing light source so disposed as to illuminate said detectors equally, said flashing giving rise to an A.C. detector output current; an output amplifier stage to amplify said output; condenser means associated with each of said detector outputs to separate into separate circuits, said A.C. current caused by said flashing light source and the linear D.C. current caused by said sun image; an A.C. amplifier stage for each detector; separate A.C. bridge means between one of said detector A.C. circuits as center and each of the other two detector A.C. circuits, each of said bridge means including a midpoint which is at null when the A.C. current on both sides of said bridge is equal; feedback means from said midpoints to the input of each of said other two detectors adapted to have any current flow value in said bridge fed back to said input so as to obtain a null value in said bridge; separate D.C. bridge means between one of said detector D.C. circuits as the center and each of said other two D.C. detector circuits, said bridges likewise including a midpoint which is at null when D.C. current on both sides of said bridges are equal, one of the bridges between said center detector circuit and one of said side detector circuits acting as the elevation circuit, and, the other bridge between said center detector and said other side detector circuit acting as the azimuth circuit; and servo means responsive to each of said elevation and azimuth circuits to move said housing in azimuth and elevation until the midpoints of said elevation and azimuth circuits are at null.

5. In a sun tracker, in combination; a housing, a telescope in said housing, adapted when aimed at the sun to project its image; three detectors arranged in said housing, at right angles to the longitudinal axis of the telescope and at a point where said sun image can be projected thereon, each detector being of a size and so disposed next to another detector that there will be projected on each, a quadrant of the sun image, each detector including a circuit capable of causing a D.C. electric current to flow in response to the action of light thereon in linear proportion to the intensity of said light; a flashing light source so disposed as to illuminate said detectors equally, said flashing giving rise to an A.C. detector output current; an output amplifier stage; condenser means associated with each of said detector outputs to separate into separate circuits said A.C. current caused by said flashing light source and the linear D.C. current caused by said sun image; an A.C. amplifier stage for each detector; separate A.C. bridge means between one of said detector A.C. circuits as center and each of the other two detector A.C. circuits, each of said bridge means including a midpoint which is at null when the A.C. current on both sides of said bridge is equal; feedback means from said midpoints to the input of each of said other two detectors adapted to have any current flow value in said bridge fed back to said input so as to obtain a null value in said bridge; separate D.C. bridge means between one of said detector D.C. circuits as the center and each of said other two D.C. detector circuits, said bridges likewise including a midpoint which is at null when D. C. current on both sides of said bridges are equal, one of the bridges between said center detector circuit and one of said side detector circuits acting as the elevation circuit, and, the other bridge between said center detector and said other side detector circuit acting as the azimuth circuit; truncated cone-shaped coarse finding means mounted on the front of said telescope to increase the effective field of view of said telescope; and servo means responsive to each of said elevation and azimuth circuits and coarse finding means to move said housing in azimuth and elevation until the midpoints of said elevation and azimuth circuits are at null.

6. In a sun tracker, in combination; a housing; a telescope in said housing, adapted when aimed at the sun to project its image; three detectors arranged in said housing, at right angles to the longitudinal axis of the telescope and at a point where said sun image can be projected thereon, each detector being of a size and so disposed next to another detector that there will be projected on each, a quadrant of the sun image, each detector including a circuit capable of causing a D.C. electric current to flow in response to the action of light thereon in linear proportion to the intensity of said light; a convex mask bordering each detector; a flashing light source so disposed as to illuminate said detectors equally, said flashing giving rise to an A.C. detector output current; an output amplification stage; condenser means associated with each of said detector outputs to separate into separate circuits, said A.C. current caused by said flashing light source and the linear D.C. current caused by said sun image; an A.C. amplifier stage for each detector; separate A.C. bridge means between one of said detector A.C. circuits as center and each of the other two detector A.C. circuits, each of said bridge means including a midpoint which is at null when the A.C. current on both sides of said bridge is equal; feedback means from said midpoints to the input of each of said other two detectors adapted to have any current flow value in said bridge fed back to said input so as to obtain a null value in said bridge; separate D.C. bridge means between one of said detector D.C. circuits as the center and each of said other two D.C. detector circuits, said bridges likewise including a midpoint which is at null when D.C. current on both sides of said bridges are equal, one of the bridges between said center detector circuit and one of said side detector circuits acting as the elevation circuit, and the other bridge between said center detector and said other side detector circuit acting as the azimuth circuit; and servo means responsive to each of said elevation and azimuth circuits to move said housing in azimuth and elevation until the midpoints of said elevation and azimuth circuits are at null.

7. In a sun tracker, in combination; a housing; a telescope in said housing, adapted when aimed at the sun to project its image; three detectors arranged in said housing, at right angles to the longitudinal axis of the telescope and at a point where said sun image can be projected thereon, each detector being of a size and so disposed next to another detector that there will be projected on each, a quadrant of the sun image, each detector including a circuit capable of causing a D.C. electric current to flow in response to the action of light thereon in linear proportion to the intensity of said light; a convex mask bordering each detector; a flashing light source so disposed as to illuminate said detectors equally, said flashing giving rise to an A.C. detector output current; an output amplification stage; condenser means associated with each of said detector outputs to separate into separate circuits said A.C. current caused by said flashing light source and the linear D.C. current caused by said sun image; an A.C. amplifier stage for each detector; separate A.C. bridge means between one of said detector A.C. circuits as center and each of the other two detector A.C. circuits, each of said bridge means including a midpoint which is at null when the A.C. current on both sides of said bridge is equal; feedback means from said midpoints to the input of each of said other two detectors adapted to have any current flow value in said bridge fed back to said input so as to obtain a null value in said bridge; separate D.C. bridge means between one of said detector D.C. circuits as the center and each of said other two D.C. detector circuits, said bridges likewise including a midpoint which is at null when D.C. current on both sides of said bridges are equal, one of the bridges between said center detector circuit and one of said side detector circuits acting as the elevation circuit, and, the other bridge between said center detector and said other side detector circuit acting as the azimuth circuit; truncated cone-shaped coarse finding means mounted on the front of said telescope to increase the effective field of view of said telescope; and servo means responsive to each of said elevation and azimuth circuits and coarse finding means to move said housing in azimuth and elevation until the midpoints of said elevation and azimuth circuits are at null.

References Cited in the file of this patent

UNITED STATES PATENTS

| | | |
|---|---|---|
| 1,747,664 | Droitcour | Feb. 8, 1930 |
| 2,714,327 | Squyer et al. | Aug. 2, 1955 |